US008636579B2

(12) United States Patent
Hornik et al.

(10) Patent No.: US 8,636,579 B2
(45) Date of Patent: Jan. 28, 2014

(54) WAGERING GAME WITH PAY LINES EXTENDING THROUGH BONUS REGIONS

(75) Inventors: Jeremy M. Hornik, Chicago, IL (US); Allon G. Englman, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 684 days.

(21) Appl. No.: 12/513,788

(22) PCT Filed: Nov. 5, 2007

(86) PCT No.: PCT/US2007/023261
§ 371 (c)(1),
(2), (4) Date: May 6, 2009

(87) PCT Pub. No.: WO2008/063392
PCT Pub. Date: May 29, 2008

(65) Prior Publication Data

US 2010/0029368 A1 Feb. 4, 2010

Related U.S. Application Data

(60) Provisional application No. 60/858,209, filed on Nov. 9, 2006.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |
| ***A63B 71/00*** | (2006.01) |
| ***A63F 1/18*** | (2006.01) |

(52) U.S. Cl.
USPC ............... 463/20; 463/16; 463/25; 273/143 R

(58) Field of Classification Search
USPC ............................ 463/16, 20, 25; 273/143 R
See application file for complete search history.

(56) References Cited

U.S. PATENT DOCUMENTS 5,205,555 A * 4/1993 Hamano .................. 273/143 R
5,511,781 A 4/1996 Wood et al.

(Continued)

FOREIGN PATENT DOCUMENTS

EP 146152 9/2004
EP 1462152 9/2004

(Continued)

OTHER PUBLICATIONS

Written Opinion corresponding to co-pending International Patent Application Serial No. PCT/US2007/023261, European Patent Office; dated Jul. 31, 2008; 7 pages.

(Continued)

*Primary Examiner* — Arthur O. Hall
*Assistant Examiner* — Wei Lee
(74) *Attorney, Agent, or Firm* — Nixon Peabody LLP

(57) ABSTRACT

A gaming machine for playing a wagering game includes a game display, a transmissive display, and a controller. The game display includes a plurality of mechanical reels bearing symbols configured to display randomly selected arrays of symbols. A transmissive display overlays the game display and is configured to display a video reel and to display a randomly selected symbol thereon. A selectable pay line extends through at least some of the mechanical reels and the video reel. The controller is configured to award an award related to the selectable pay line when a winning combination of symbols are displayed along the selectable pay line.

25 Claims, 7 Drawing Sheets

(56) References Cited

U.S. PATENT DOCUMENTS

| | | | |
|---|---|---|---|
| 6,261,178 | B1 | 7/2001 | Bennett |
| 6,322,445 | B1 | 11/2001 | Miller |
| 6,544,120 | B2 * | 4/2003 | Ainsworth ...................... 463/20 |
| 6,569,013 | B1 | 5/2003 | Taylor |
| 7,494,413 | B2 | 2/2009 | Singer et al. |
| 7,585,221 | B2 | 9/2009 | Singer et al. |
| 2001/0054794 | A1 * | 12/2001 | Cole et al. .................. 273/138.1 |
| 2002/0055382 | A1 * | 5/2002 | Meyer ............................. 463/20 |
| 2002/0175466 | A1 * | 11/2002 | Loose et al. ............. 273/143 R |
| 2004/0140618 | A1 | 7/2004 | Fox |
| 2004/0195773 | A1 | 10/2004 | Masci et al. |
| 2005/0009597 | A1 * | 1/2005 | Daly ............................... 463/20 |
| 2005/0159208 | A1 * | 7/2005 | Pacey .............................. 463/20 |
| 2005/0215311 | A1 | 9/2005 | Hornik et al. |
| 2006/0040728 | A1 | 2/2006 | Fuller |
| 2006/0135243 | A1 | 6/2006 | Englman et al. |
| 2006/0247002 | A1 * | 11/2006 | Yoshimi et al. ................. 463/20 |
| 2007/0173315 | A1 | 7/2007 | Law |

FOREIGN PATENT DOCUMENTS

| | | |
|---|---|---|
| GB | 2411750 | 9/2005 |
| WO | WO 2007/005846 | 1/2007 |
| WO | WO 2007/078752 | 7/2007 |

OTHER PUBLICATIONS

International Search Report corresponding to co-pending International Patent Application Serial No. PCT/US2007/023261, European Patent Office; dated Jul. 31, 2008; 3 pages.

International Search Report, PCT/US2007/023261, 2 pages, dated Apr. 24, 2008.

* cited by examiner

WAGERING GAME WITH PAY LINES EXTENDING THROUGH BONUS REGIONS

CROSS REFERENCE TO RELATED APPLICATIONS

This application is a U.S. national stage of International Application No. PCT/US2007/023261, filed Nov. 5, 2007, which is related to and claims priority from U.S. Provisional Application No. 60/858,209, filed Nov. 9, 2006, which are both incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present concepts relate generally to gaming machines and methods of playing wagering games and, more particularly, to wagering games with enhanced features provided by video images superimposed over a display of the gaming machines.

BACKGROUND

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "base" game. The bonus game may comprise any type of game, either similar to or completely different from the base game, which is entered upon the occurrence of a selected event or outcome in the base game. Generally, bonus games provide a greater expectation of winning than the base game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines.

Another way to increase the entertainment value of a game is to enhance the display of the gaming machines. For gaming machines with video displays, improvements in video technology have enabled the display of richer and more colorful graphics. For gaming machines with mechanical displays, however, the enhancements early on were less technologically advanced. For example, some mechanical reel symbols were colored by backlighting the mechanical symbols with colored lighting elements. Sometimes the reel itself might contain electroluminescent elements that defined one or more reel symbols. To display a symbol in multiple colors or formats using such an arrangement, multiple electroluminescent elements were needed for the symbol.

Recent advances in transmissive display technology have made it possible to more easily modify the appearance of mechanical displays. A transmissive display is essentially a transparent video display that is superimposed over the mechanical display. The transmissive display may then be operated to display selected video images over the mechanical display. These video images may include translucent portions such that the underlying mechanical display is visible, but in an altered state (i.e., different color, texture, etc.). The video images may also include opaque portions so as to completely block out parts of the underlying mechanical display. For information regarding the use of transmissive display technology in gaming machines and for embodiments employing transmissive displays, the reader is referred to commonly assigned U.S. Published Application No. 20040198485, titled "Gaming Machine with Superimposed Display Image," filed on Nov. 7, 2003, and also to commonly-assigned U.S. Pat. No. 6,517,433, titled "Reel Spinning slot Machine With Superimposed Video Image," issued on Feb. 11, 2003, each of which being incorporated herein by reference in its entirety. Co-pending PCT Application entitled "Wagering Game With Overlying Transmissive Display For Providing Enhanced Game Features," filed Jun. 30, 2005, and claiming priority from U.S. Provisional Pat. Application Ser. No. 60/695,563, filed on Jun. 30, 2004, is hereby incorporated by reference in its entirety.

The above-described transmissive display technology gives wagering game designers the capability and flexibility to more easily design and modify the appearance of mechanical displays. Accordingly, there is a need to develop new and improved wagering games for mechanical displays using this technology, with features that take full advantage of the capabilities of the transmissive display to thereby enhance the entertainment value of the wagering games.

SUMMARY OF THE DISCLOSURE

According to one aspect of the present concepts, a gaming machine for playing a wagering game is provided which includes a game display, a transmissive display, and a controller. The game display includes a plurality of mechanical reels bearing symbols configured to display randomly selected arrays of symbols. The transmissive display overlays the game display and is configured to display a video reel and to display a randomly selected symbol thereon. At least one selectable pay line extends through only the mechanical reels and at least one selectable pay line extends through at least some of the mechanical reels and the video reel. The controller is configured to award an award related to the selectable pay line when a winning combination of symbols are displayed along an active one of the selectable pay lines.

According to another aspect of the present concepts, a gaming system for conducting a wagering game includes a mechanical reel display having a plurality of symbol-bearing mechanical reels configured to indicate a randomly selected outcome of the wagering game and a transmissive display overlaying the mechanical reel display. The transmissive display is configured to display a video reel and to display, in association therewith, a randomly-determined symbol. The gaming system also includes a controller communicatively coupled to the mechanical reel display and the transmissive display. The controller is programmed to randomly determine a wagering game outcome comprising mechanical reel symbols and a video reel symbol.

According to yet another aspect of the present concepts, a gaming machine for playing a wagering game includes a game display and a transmissive display overlaying the game display. The game display includes a plurality of mechanical reels bearing symbols selected from a first set of symbols. The mechanical reels are configured to display a randomly determined array of the symbols. The transmissive display is configured to display one or more video reels adjacent one or more of the symbol-bearing mechanical reels. The one or more video reels include one or more symbol positions adapted to display a randomly-determined symbol selected from a second set of symbols. In accord with this aspect, at least one selectable pay line is provided comprising a pre-defined set of symbol positions from the video reel(s) and from a subset of the mechanical reels. A controller is configured to award an award related to the at least one selectable pay line when a winning combination of symbols are displayed in symbol positions associated with the at least one active selectable pay line.

According to another aspect of the invention, a method of conducting a wagering game on a gaming system includes the act of providing a wagering game display, the wagering game display including a plurality of symbol-bearing mechanical reels and a transmissive display overlaying the game display and the transmissive display being configured to display a video reel. The method also includes the act of associating an input wager to one or more pay lines, at least one pay line comprising a set of symbol positions selected from the symbol-bearing mechanical reels and from the video reel. The method further includes the act of displaying a randomly-determined outcome of the wagering game using the plurality of symbol-bearing mechanical reels and the video reel.

According to yet another aspect of the invention, a computer readable storage medium is encoded with instructions for directing a gaming system to perform the above method.

According to still another aspect of the invention, a gaming machine for playing a wagering game includes a game display including a plurality of mechanical reels bearing symbols selected from a first set of symbols, the mechanical reels being configured to display a randomly determined array of the symbols. The gaming machine also includes a transmissive display, overlaying the game display, configured to display a video reel adjacent a symbol-bearing mechanical reel, the video reel comprising at least one symbol position adapted to display a symbol randomly selected from a second set of symbols. A first plurality of selectable pay lines comprises a first pre-defined set of symbol positions selected from only the plurality of mechanical reels. The gaming machine also includes at least one selectable pay line comprising a second pre-defined set of symbol positions comprising at least one mechanical reel symbol position and at least one video reel symbol position. A controller is configured to award an award related to the at least one selectable pay line when a winning combination of symbols are displayed in symbol positions associated with the at least one active selectable pay line.

In each of the above aspects, the transmissive display may optionally be replaced by a virtual image configuration provided a reflected video image rather than a direct image.

Additional aspects of the invention will be apparent to those of ordinary skill in the art in view of the detailed description of various embodiments, which is made with reference to the drawings, a brief description of which is provided below.

DETAILED DESCRIPTION

Figure 1:
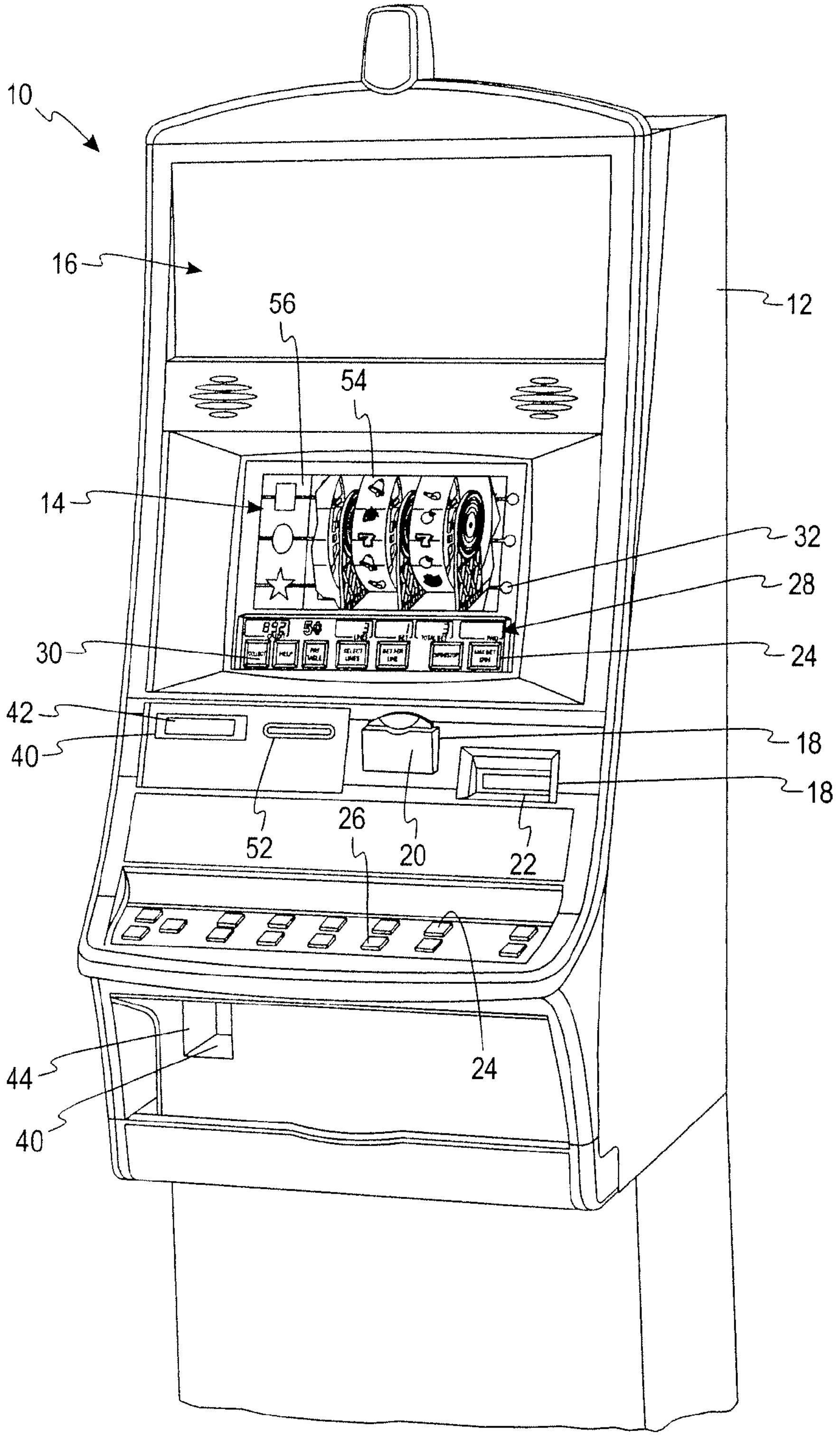
FIG. 1 is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a mechanical reel gaming machine 10 similar to those used in gaming establishments, such as casinos, is shown. The gaming machine 10 comprises a housing 12 and a number of input devices, including a value input device 18 and a player input device 24. For outputs, the gaming machine 10 comprises a primary display area 14 for displaying information about base wagering games and a secondary display area 16 for displaying game events, game outcomes, and/or signage information. The primary display area 14 and/or secondary display area 16 may also display information about bonus wagering games and progressive wagering games. In accordance with embodiments of the invention, the primary display area 14 comprises a plurality of mechanical reels 54 and a transmissive display 56 superimposed over the mechanical reels 54. Each of the foregoing components is described in more detail below. While the exemplary embodiments described below refer to the mechanical reels 54, in other embodiments at least some of the mechanical reels 54 can be replaced with video reels 54' (see FIG. 3). Thus, alternatively, the primary display area 14 can include a transmissive display 56 being superimposed over a combination of mechanical reels 54 and video reels 54'.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency. Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like on the primary display area 14 (over the transmissive display 56) and/or on secondary display area 16. The touch screen 28 contains soft touch keys 30 denoted by graphics on the underlying primary display area 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

A player begins play of the base wagering game by making a wager via the value input device 18 of the gaming machine 10. A player can select play by using the player input device 24, via the buttons 26 or the touch screen keys 30. The base game consists of a plurality of symbols arranged in an array, and includes at least one pay line 32 that indicates one or more outcomes of the base game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display area 16 or other dedicated player-tracking display for providing the player with information about his or her account or other player-specific information. Also, in some embodiments, the information reader 52 may be used to restore game assets that the player achieved and saved during a previous game session.

In the illustrated embodiment, the gaming machine 10 is an "upright" version in which the primary display area 14 is oriented vertically relative to the player. Alternatively, the gaming machine may be a "slant-top" version in which the primary display area 14 is slanted at about a thirty-degree angle toward the player of the gaming machine 10. Furthermore, although only three mechanical reels are shown in the primary display area 14, those having ordinary skill in the art will recognize that the gaming machine 10 may comprise fewer or more mechanical reels (e.g., four reels, five reels, etc.), depending on the particular configuration of the primary display area 14.

Figure 2A:
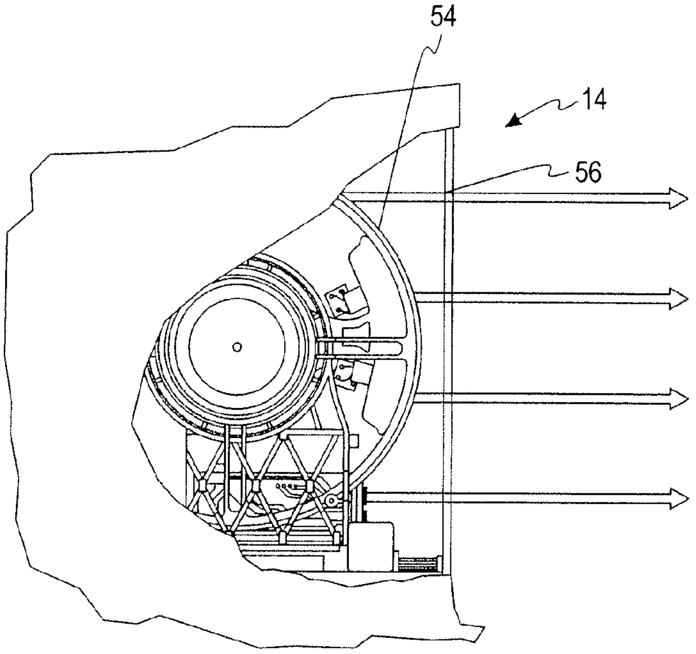
FIGS. 2*a*-2*b* are cross-sectional side views of a display area embodying the present invention.
Figure 2B:
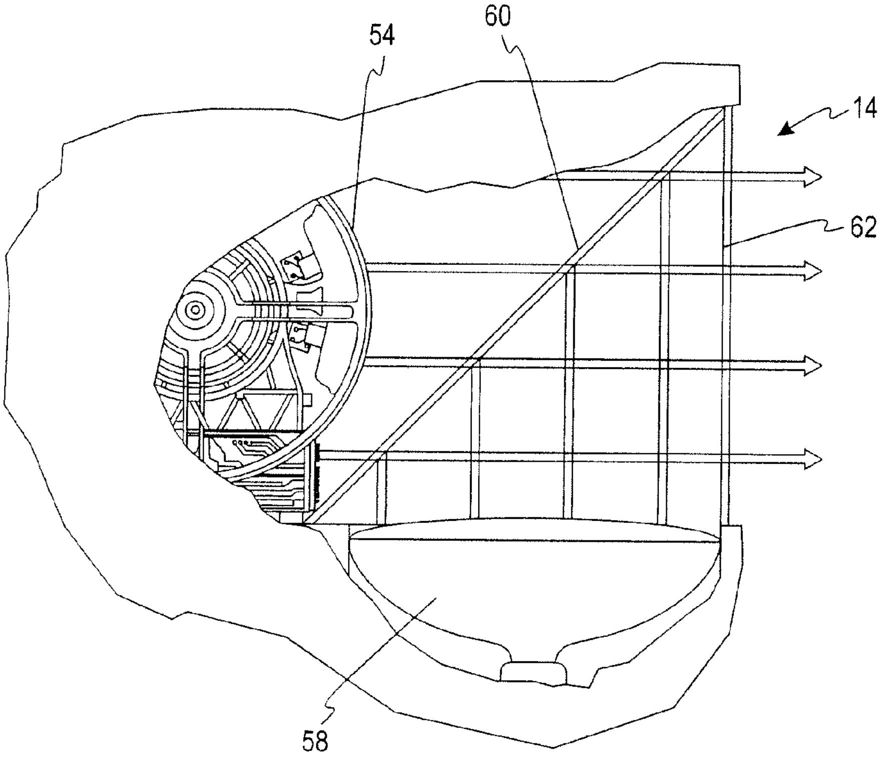

FIGS. **2*a*-2*b* illustrate exemplary implementations of the primary display area 14 in which a video image is superimposed over the mechanical reels 54. Although not expressly labeled, each reel of the mechanical reels 54 has a plurality of reel symbols (see FIG. 1) that represent a randomly-selected outcome of the wagering game. The video image may then be positioned over the mechanical reels 54 to enhance and/or alter the appearance (e.g., color, texture, etc.) of the mechanical reels 54. There are at least two possible configurations for the primary display area 14: a direct image configuration (FIG. 2*a*), and a virtual image configuration (FIG. 2*b***). These configurations are described below.

Referring to FIG. **2*a*, in the direct image configuration, a transmissive display 56 is positioned directly in front of the mechanical reels 54 and generates a direct image. In such an arrangement, the transmissive display 56 may be a flat panel transmissive video display, for example, a transmissive liquid crystal display (LCD) commercially available from LG Phillips LCD Co., Ltd., of Seoul, Korea, Sharp Electronics Corp. of Tokyo, Japan, and other display manufacturers. The flat panel transmissive video display is preferably preconfigured with the touch screen 28 (see FIG. 1**) mounted to a front surface of the display.

In the virtual image configuration, shown in FIG. **2*b*, a reflected video image is used instead of a direct image. In such an arrangement, the reflected video image may be generated by, for example, a standard video display 58 and a partially reflective mirror 60. The standard video display 58 may be mounted below the mechanical reels 54 and substantially normal thereto, and the partially reflective mirror 60 may be positioned over the mechanical reels 54 at a predetermined angle (e.g., 45 degrees). Video images from the standard video display 58 are then reflected off the partially reflective mirror 60 so that they appear to a player to be superimposed over the mechanical reels 54. The standard video display 58 may be any suitable video display known to those having ordinary skill in the art, including a CRT, LCD, dot matrix, LED, electro luminescent, and the like. In some embodiments, the primary display area 14 further comprises a transparent glass cover/window 62 positioned over the partially reflective mirror 60 to protect the mirror 60. Such a cover/window 62 may be optionally configured with the touch screen 28** for receiving player input.

The superimposed video images may be selectively made transparent, semi-transparent (i.e., translucent), or opaque in selected places. This allows preselected images to be displayed over certain portions of the primary display area 14, with the result that certain areas of the primary display area 14 are either altered in some way (e.g., highlighted, colored, etc.), or completely blocked by the superimposed images. All video images superimposed on the primary display area 14 may be rendered in two-dimensional (e.g., using Flash Macromedia™) or three-dimensional graphics (e.g., using Renderware™). The images may be played back (e.g., from a recording stored on the gaming machine 10), streamed (e.g., from the gaming network), or received as a TV signal (e.g., either broadcast or via cable). The images may be animated, or they may be real-life images, either prerecorded (e.g., in the case of marketing/promotional material) or as live footage, and the format of the video images may be an analog format, a standard digital format, or a high-definition (HD) digital format. Using superimposed video images in this way allows numerous types of improvements and enhancements to be made to the appearance of the primary display area 14 in real time and during on-going game play.

Figure 3:
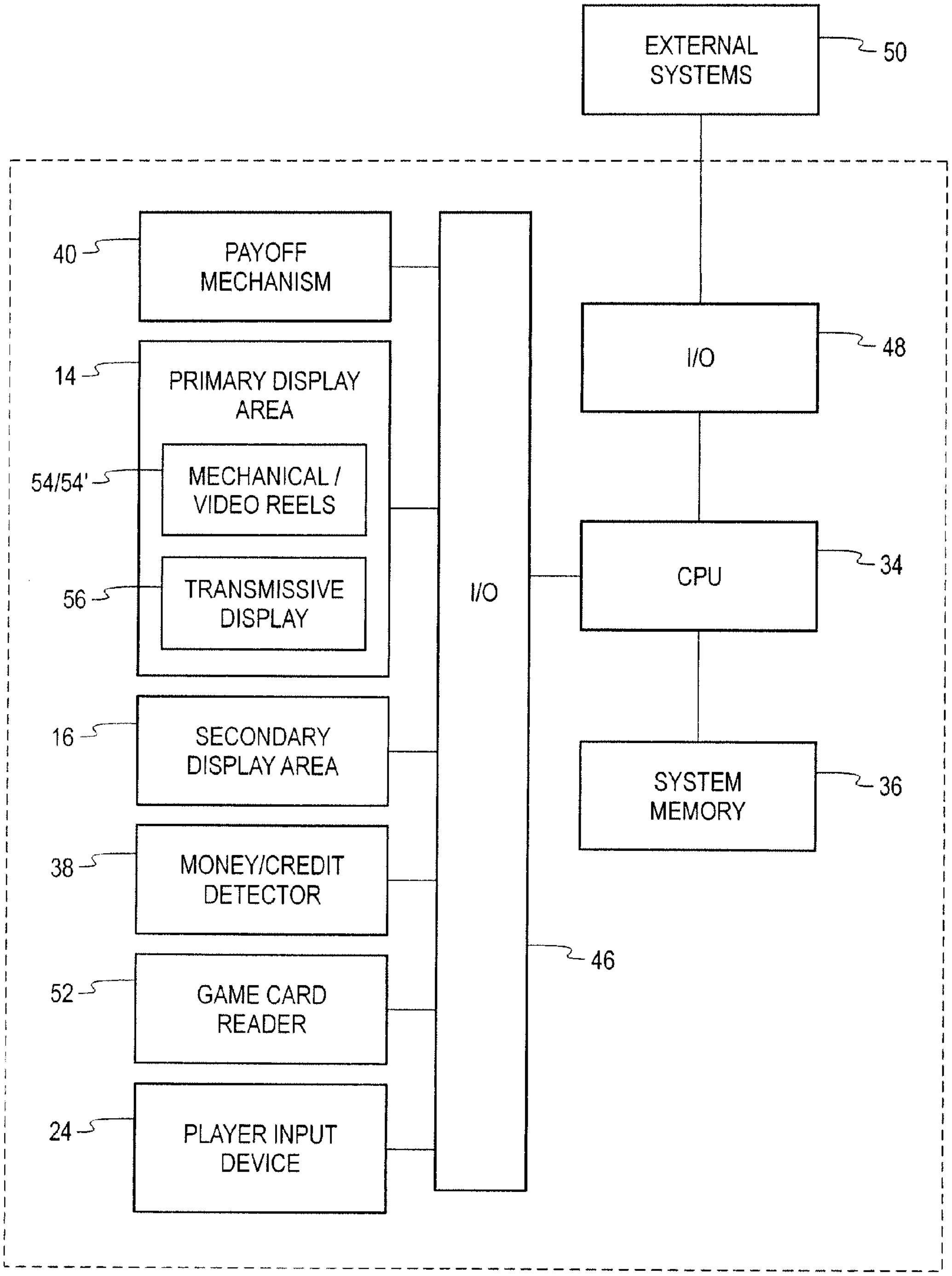
FIG. 3 is a block diagram of a control system suitable for operating the gaming machine of FIG. 1.

Turning now to FIG. 3, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10, but may be located outboard of the housing 12 and connected to the remainder of the components of the gaming machine 10 via a variety of different wired or wireless connection methods.

As seen in FIG. 3, the controller 34 is also connected to, and controls, the primary display area 14, the player input device 24, and a payoff mechanism 40. The primary display area 14 in this embodiment uses the transmissive display 56 to superimpose a video image over the mechanical/video reels 54/54', but a reflected image arrangement (see FIG. 2*b*) may also be used in other embodiments. The payoff mechanism 40 is operable in response to instructions from the controller 34 to award a payoff to the player in response to certain winning outcomes that might occur in the base game or the bonus game(s). The payoff may be provided in the form of points, bills, tickets, coupons, cards, and the like. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, and the like. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 3, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10.

By virtue of the superimposed video images, a variety of traditional as well as visually-enhanced wagering games involving the mechanical reels 54 may be played on the gaming machine 10. These wagering games may be provided to the gaming machine 10 using any suitable means known to those having ordinary skill in the art, including hardware upgrades as well as direct downloads via external systems 50. In the latter case, the gaming machine 10 may communicate with the external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. Numerous alternative configurations are possible such that the aforementioned and other functions may be performed onboard or external to the gaming machine 10 as may be necessary for particular applications.

Thus far, embodiments of the invention have only been described as video images being superimposed on the primary display area 14. It is also possible, however, to superimpose the video images on the secondary display area 16 as well without departing from the scope of the invention. Still, in most embodiments, the primary display area 14 is the one with the video images superimposed thereon. The reason for this is because in most gaming machines 10, the primary display area 14 is the one that includes the mechanical reels (e.g., for a slot machine), a mechanical wheel (e.g., a roulette game), one or more dice, a pachinko board, or other board game. In alternative embodiments, however, the primary display area 14 may include video reels 54' by using a video display such as a CRT or LCD. Video images may then be superimposed on the video reels 54' as needed. In further alternative embodiments, the primary display area 14 may include a diorama presenting a three-dimensional model of a game environment. The diorama may be stationary in some implementations, or it may slide or move around in one or more dimensions.

Figure 4:
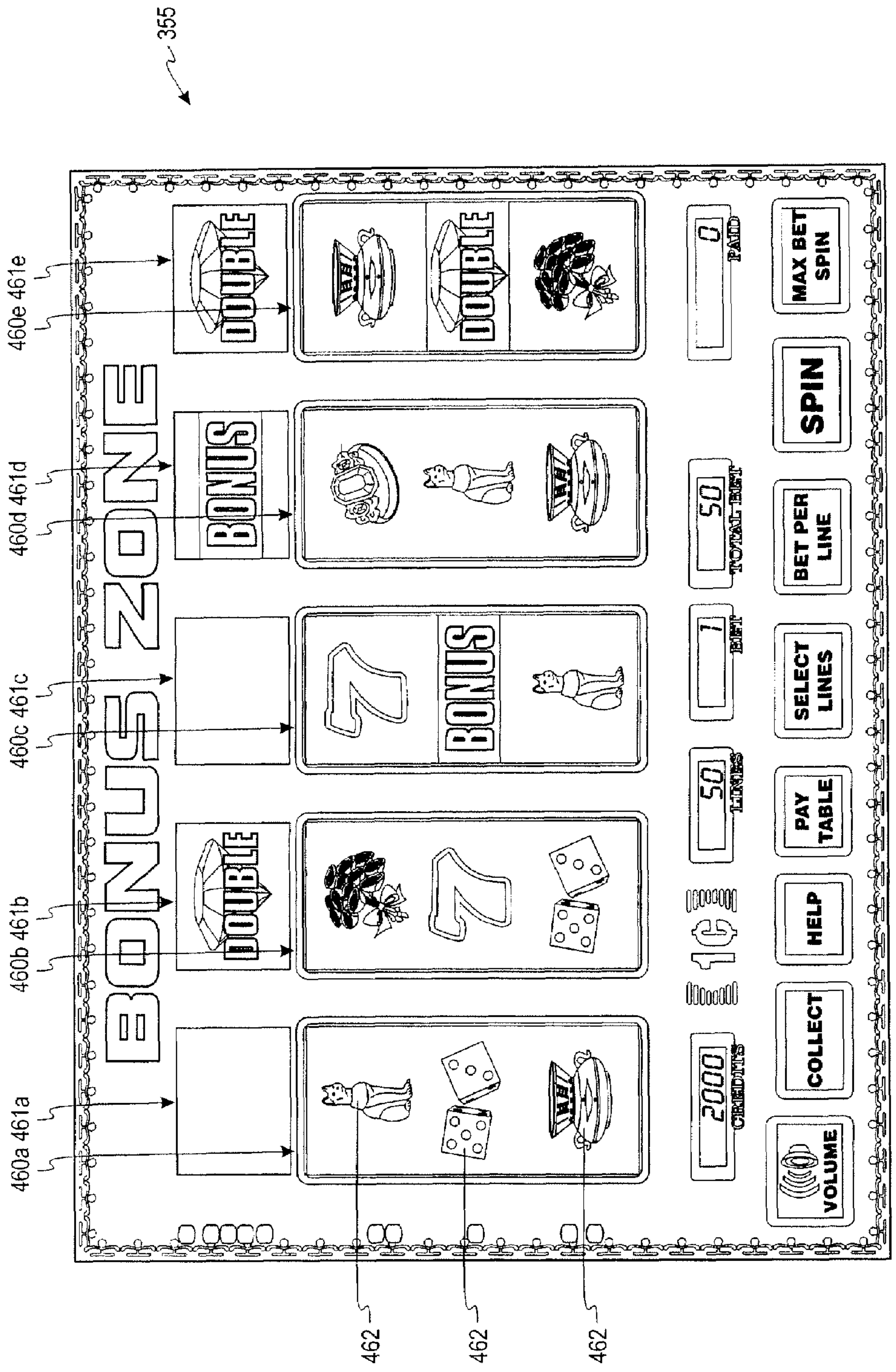
FIG. 4 is a screen representation of at least some aspects of an embodiment of the present concepts.
Figure 5:
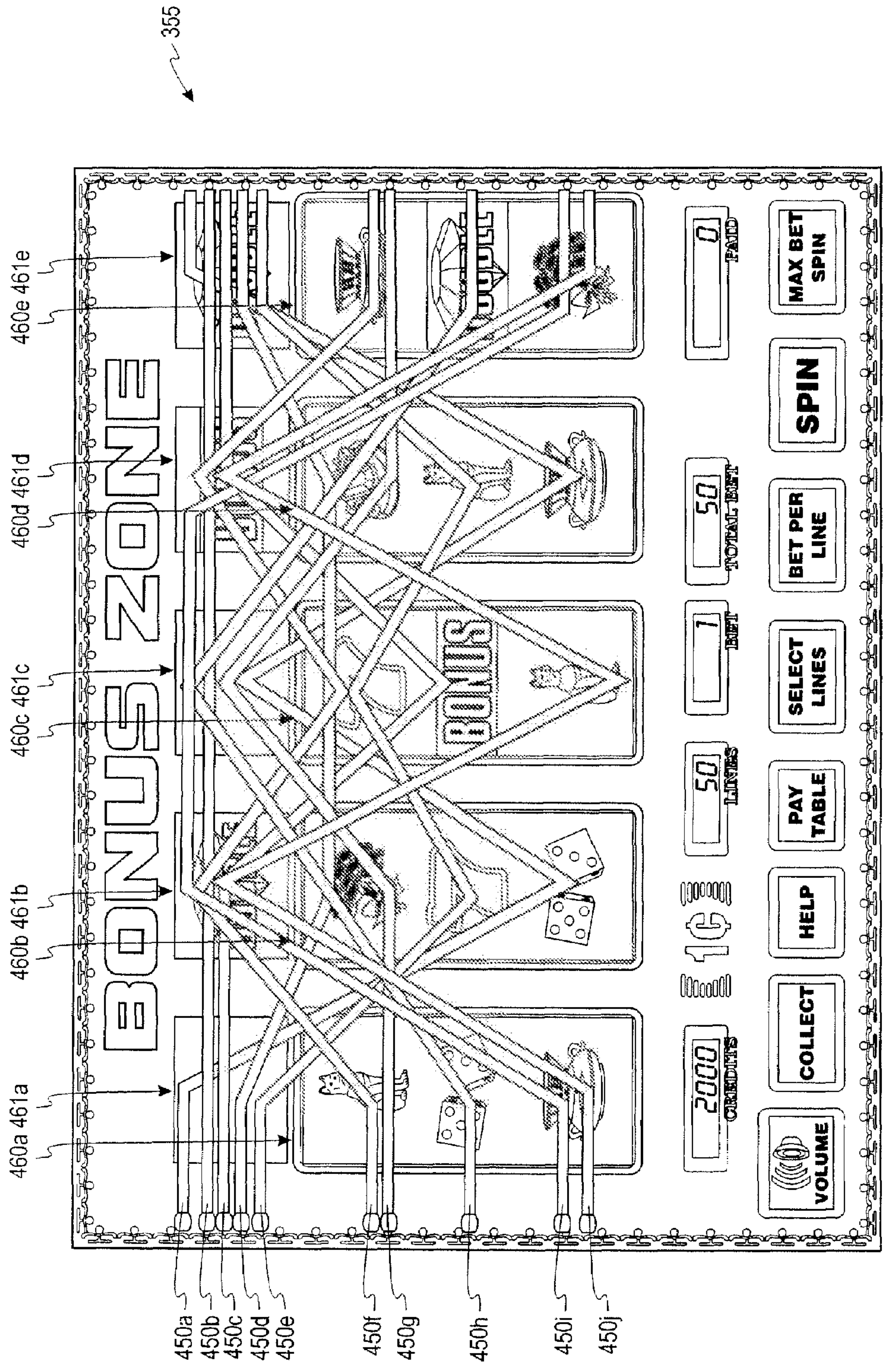
FIG. 5 is a another screen representation of at least some aspects of an embodiment of the present concepts.

FIG. 4 shows a display area 355 including a plurality of mechanical reels 460*a*-460*e*. Each of the mechanical reels 460*a*-460*e* bears a plurality of symbols 462 positionable to represent a randomly-selected outcome associated with the wagering game. In at least some aspects, a transmissive display overlays the game display, such as is shown by way of example in FIG. 2*a*, wherein the transmissive display 56 is positioned directly in front of the mechanical reels 54. The transmissive display is configured to display one or more video reels, such as video reels 461*a*-461*e*, displayed as single symbol reels in FIGS. 4-7, and to display a randomly selected symbol thereon. In at least some other aspects, a reflected video image may be used to generate the video reel(s) 461*a*-461*e* in the manner described above with respect to FIG. 2*b*. Whether produced by a transmissive display or a reflected display, the display area 355 in the example of FIGS.

4-7 comprises a plurality of video reels 461*a*-461*e*, each of the video reels including at least one symbol position. In other aspects, a greater (e.g., ten) or lesser (e.g., one) number of video reels may be provided and each video reel may include one or more symbol positions. Although the video reels 461*a*-461*e* are shown to be disclosed directly above the mechanical reels 460*a*-460*e*, the video reels may be disposed in another other position, such as being offset from the mechanical reels, disposed between adjacent mechanical reels, disposed below the mechanical reels, or the like.

In at least some aspects of the present concepts, the mechanical reels 460*a*-460*e* symbol positions are each associated with a symbol 462 selected from a first set of symbols. The video reels 461*a*-461*e*, however, are configured to display a symbol selected from a second set of symbols, the second set of symbols being different, in at least some respects, from the first set of symbols. Thus, the first set of symbols associated with the mechanical reels 460*a*-460*e* may differ from the second set of symbols associated with the video reels 461*a*-461*e* by a mere symbol. Stated different, the difference between the first set and the second set must comprise at least one symbol to differentiate the first set from the second set. In at least some aspects, the second set of symbols may advantageously comprise a thematic subset of symbols selected from the first set of symbols (e.g., award modifier symbols, bonus game qualifying symbols, etc.).

In still other aspects of the present concepts, the first set of symbols associated with the mechanical reels 460*a*-460*e* may be a subset of (i.e., a different set than) the second set of symbols associated with the video reels 461*a*-461*e*. Thus, the video reels 461*a*-461*e* may comprise a set of symbols including at least one symbol (e.g., blank symbols, award modifiers, bonus game triggers, and/or wild symbols, etc.) not present on the mechanical reels 460*a*-460*e*.

In the illustrated example of FIG. 4, both the mechanical reels 460*a*-460*e* and the video reels 461*a*-461*e* are shown to share a number of common symbols, specifically the "DIAMOND DOUBLE" symbols shown on mechanical reel 460*e* and video reels 461*b*, 461*e* and the "BONUS" symbols shown on mechanical reel 460*c* and video reel 461*d*. However, in such aspects, each of the symbol sets for the mechanical reels 460*a*-460*e* and the video reels 461*a*-461*e* retain unique symbols not found in the other set. As shown in FIG. 4, the mechanical reels 460*a*-460*e* comprise symbols including a pair of dice, cherries, a number "7," a ring, a cat, and a bouquet of flowers, as well as award modifier symbols comprising symbols including "BONUS" and "DIAMOND DOUBLE" symbols. FIG. 4 also shows that the video reels 461*a*-461*e* comprise symbols including "BONUS," "DIAMOND DOUBLE" and "BLANK" (i.e., the absence of any symbol) symbols. In the illustrated example, the video reels 461*a*-461*e* do not include, however, the dice, cherries, numeral "7," ring, cat, or flower symbols, nor do the mechanical reels 460*a*-460*e* include a "BLANK" symbol. Alternative award modifier symbols for one or both of the mechanical reels 460*a*-460*e* and/or video reels 461*a*-461*e* also may include, but are not limited to, wild symbols, multiplier symbols, and/or bonus trigger symbols.

The video reel 461*a*-461*e* symbol positions provide additional opportunities for players to link together, via additional pay lines 450*a*-450*j* (see FIG. 5), outcomes across a plurality of combinations of mechanical reels 460*a*-460*e* in a new and exciting manner. In the illustrated example of FIGS. 3-7, the symbol positions of the mechanical reels 460*a*-460*e* define a 3×5 array and the video reel 461*a*-461*e* symbol positions define an additional 1×5 array. Outcomes occurring in association with the video reel 461*a*-461*e* symbol positions have the potential, if occurring along a selected pay line 450*a*-450*j*, to modify a winning outcome on selected combinations of the mechanical reels 460*a*-460*e* and/or to form, in combination therewith, a winning outcome.

In accord with the present concepts, the mechanical reel 460*a*-460*e* symbol positions may define any n×n or n×m array, where n and m may comprise any integer, and the video reels 461*a*-461*e* symbol positions may likewise define any n×n or n×m array, wherein where n and m may comprise any integer which may be the same as or different than the values of n and m defining the array of mechanical reel symbol positions. For example, in at least some aspects, the n×n or n×m array defined by the video reel symbol positions may comprise a 1×1 array (i.e., a single symbol reel), a 1×2 array, a 1×3 array, or a 1×4 array, and need not span the entire set of mechanical reel 460*a*-460*e* symbol positions. Thus, in accord with at least some aspects of the present concepts, a single video reel 461*c* symbol position may be provided adjacent (e.g., above, below, beside, etc.) a selected mechanical reel (e.g., 460*c*) with a number of additional pay lines (e.g., one or more) passing therethrough or being otherwise associated therewith to relate, in some capacity, the outcomes of the mechanical reels to the outcome of the video reel 461*c*. The video reel (e.g., 461*c*) may, accordingly, modify a winning outcome on mechanical reels along a selected pay line and/or to form a winning outcome in combination with such mechanical reels along the selected pay line.

To illustrate aspects of the above-noted embodiments of the present concepts, as well as aspects described hereinafter, the array defined by the mechanical reels 460*a*-460*e* and video reel(s) 461*a*-461*e* may comprise any combination of, for example, mechanical reel 460*a*-460*e* symbol positions defining a 1×5 array, 2×5 array, 3×5 array, or 4×5 array, and the video reel 461*a*-461*e* symbol positions defining a 1×5 array, 2×5 array, 3×5 array, a 4×5 array, or even a variable array (i.e., a n×n or n×m array that is adaptive or responsive to a game play variable such as, but not limited to, a past outcome, a current outcome, a player status or ID, and/or a wager). A plurality of video reels 461*a*-461*e* symbol positions may be provided to define a plurality of arrays such as, but not limited to, a 1×5 array both above and below the mechanical reel 460*a*-460*e* array.

To demonstrate the adaptability and power of the system disclosed herein, the aforementioned 1×1 video reel (i.e., a single symbol reel), or even a plurality of 1×1 video reels, may be distributed about the display area 355 in an ordered arrangement (e.g., a symmetric or asymmetric array, etc.) or a semi-ordered or disordered arrangement (e.g., unequal spacing and/or vectors between adjacent symbol positions, etc.). In another aspect, the video reels 461*a*-461*e* may randomly "float" about the primary display area 14 before, during, or after the spinning of the mechanical reels 460*a*-460*e*. At some point before, during, or after the spinning of the mechanical reels 460*a*-460*e*, each of the floating video reels is associated with a specific video reel symbol position (i.e., with a particular pay line associating the video reel with the mechanical reels). Thus, for example, following a reveal of the random outcomes for the mechanical reels 460*a*-460*e*, and possibly even a reveal of the random outcomes for each of the video reels, the video reels may randomly move above and finally settle in place adjacent one of the mechanical reels, so as to heighten a player's anticipation regarding the final outcome.

In still other aspects, the video reel symbol position(s) (e.g., 461*a*-461*e*) may be positioned over one or more mechanical reel 460*a*-460*e* symbol positions. As noted above, video images may be positioned over the mechanical reels and may be selectively made transparent, semi-transparent, or opaque. Thus, the video reel symbol position(s) need not be relegated to a position laterally adjacent the mechanical reels 460*a*-460*e* and the video reel symbol position(s), along with associated pay lines, may be advantageously superimposed over a corresponding number of mechanical reel symbol position(s) so as to provide an additional opportunity or additional opportunities to modify a winning outcome on mechanical reels along a selected pay line and/or to form a winning outcome in combination with such mechanical reels along the selected pay line. The video reel symbol position(s) superimposed over the mechanical reel symbol position(s) may complement or may supersede the underlying mechanical reel symbol position(s).

Again, referring to the example depicted in FIG. 4, the mechanical reels 460*a*-460*e* show an arbitrary non-winning outcome and the video reels 461*a*-461*e* show no outcomes which would form a winning outcome in combination with the depicted outcomes of the mechanical reels along any pay line. The symbol positions associated with the video reels 461*a*-461*e* are, respectively, "BLANK," "DIAMOND DOUBLE," "BLANK," "BONUS," and "DIAMOND DOUBLE." The video reels 461*a*-461*e* may advantageously include other symbols such as, but not limited to, a "WILD" symbol, which could permit a player to make, for example, a winning 2-symbol combination into a winning 3-symbol combination or a winning 3-symbol combination into a winning 4-symbol combination.

As noted above, FIG. 5 shows various exemplary, but non-limiting, pay lines 450*a*-450*j* that link one or more of the video reel 461*a*-461*e* symbol positions with various combinations of mechanical reels 460*a*-460*e*. Each of the illustrated pay lines 450*a*-450*j*, as well as the traditional pay lines (not shown), extend through various combinations of mechanical reel 460*a*-460*e* symbol positions. Should a winning outcome be achieved along a selected pay line, such as the population of the pay line by a minimum set of winning symbols in a predetermined arrangement, the player receives an award associated with that winning outcome.

These ten additional pay lines 450*a*-450*j* or "lines of action" complement the numerous (e.g., 10, 20, 30, or 40 or more) traditional pay lines (not shown for clarity) encompassing different permutations symbol position combinations for mechanical reels 460*a*-460*e*. In one aspect, for the example of FIGS. 4-7, forty pay lines are provided for reel symbol position combinations limited exclusively to the 3×5 symbol array defined by the mechanical reels 460*a*-460*e*. Many more pay lines exclusive to the mechanical reels 460*a*-460*e* may be provided, if desired, limited only by the potential number of combinations of the 3×5 symbol array. Likewise, the number of pay lines encompassing both at least one mechanical reel and at least one video reel is limited only by the number of potential combinations within the generated symbol array (e.g., a combined 4×4 array, as shown in FIGS. 4-7). The present concepts expressly includes any arrangement of symbol positions, however distributed, of any size, comprising both mechanical reels and at least one video reel provided in association with the mechanical reels.

Although pay lines are typically denoted by a line or marker crossing a unique set of reel symbol positions, the line or marker comprising an indicator or button at each end thereof, such line or marker may also comprise only a single indicator or button at one end thereof. Alternatively, the indicator or button at each end of the pay line may be entirely omitted and the different pay lines may be highlighted for selection by a player's scrolling through or navigating through highlighted pay lines or groupings of pay lines. In the example represented in FIG. 5, each pay line 450*a*-450*j* is identified by a line or marker crossing a unique set of reel symbol positions, the line or marker comprising an indicator or button at a left end of the display. Each line or marker traversing the reel symbol positions may advantageously comprise a unique color, color combination, or visually unique characteristic to allow a player to clearly differentiate the pay lines from one another and to enable the player to readily identify pay lines associated with particular combinations of symbol positions in which the player may have an interest. The present concepts are not limited, in any way, to the depiction of or arrangement of pay lines.

In FIGS. 4-7, the "BONUS ZONE" graphics relate, in the depicted example, to the additional pay lines provided in association with the added video reel 461*a*-461*e* symbol positions. The depicted arrangement is, however, not limiting and one or more video reels, each video reel comprising one or more symbol positions, may be disposed anywhere on the primary display area 14.

Figure 6:
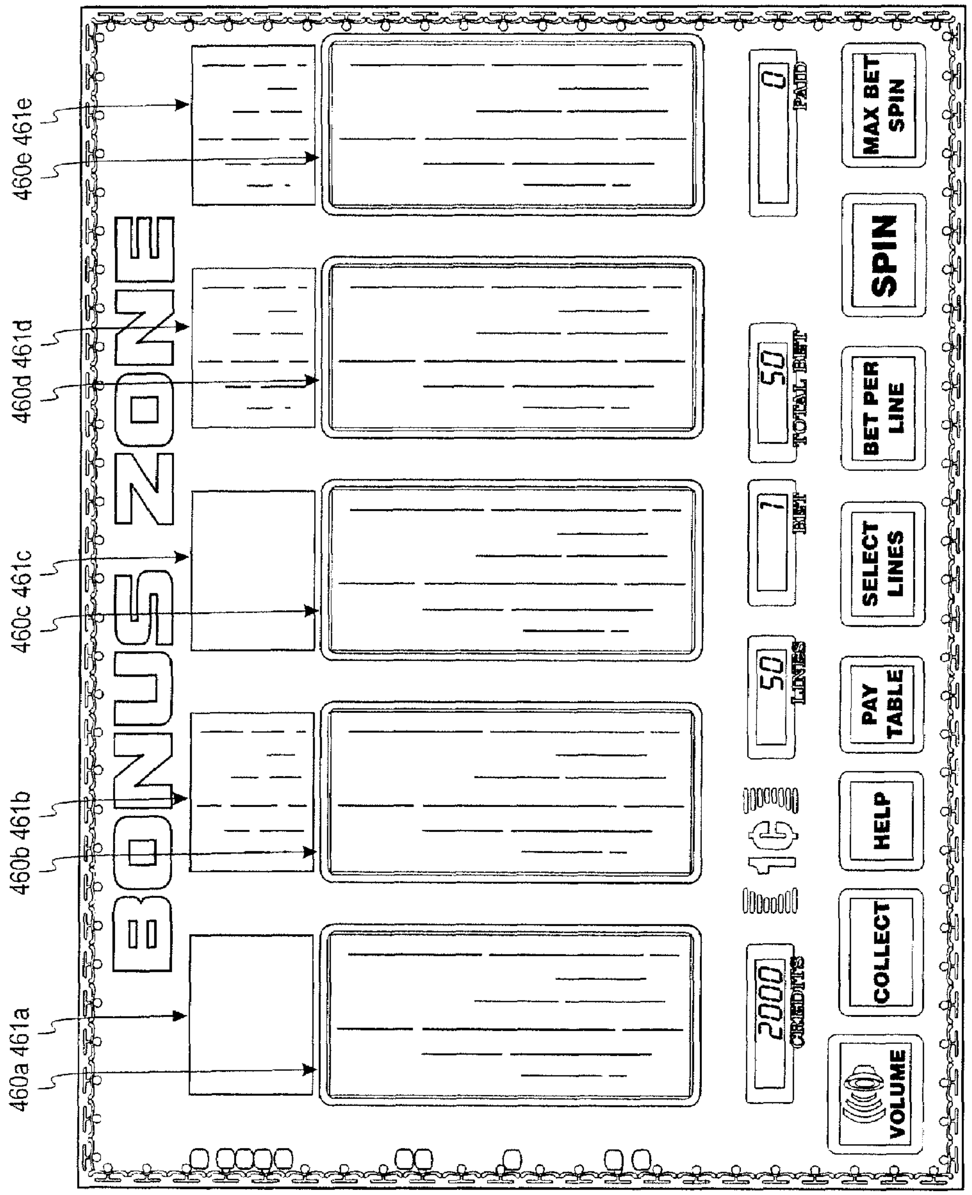
FIG. 6 is a another screen representation of at least some aspects of an embodiment of the present concepts.

FIG. 6 represents that the video reels 461*a*-461*e* and mechanical reels 460*a*-460*e* are spinning responsive to receiving a wager from the player and initiation of the spin, such as through a spin button (mechanical), spin button (touch screen), or lever.

Figure 7:
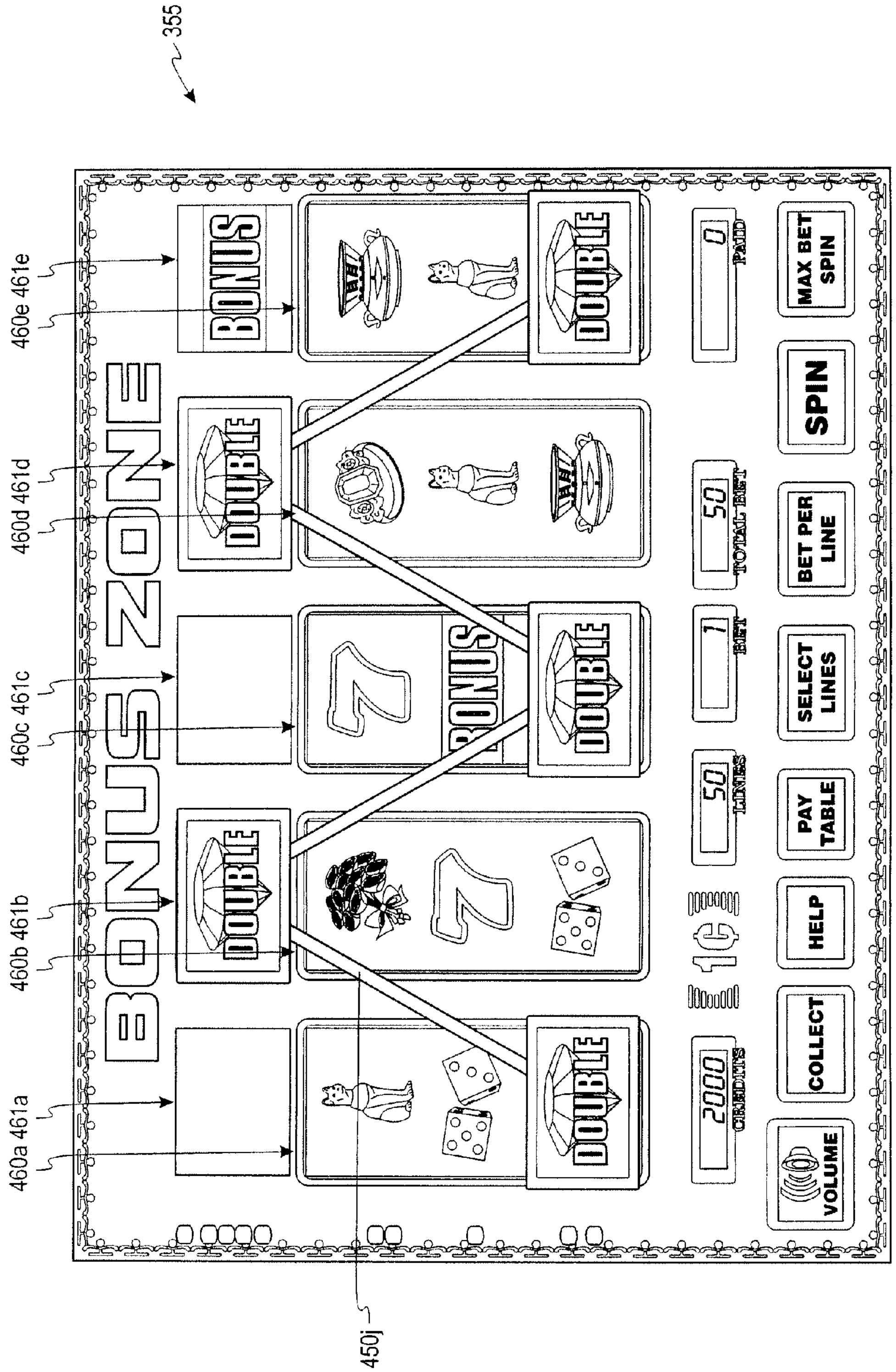
FIG. 7 is a another screen representation of at least some aspects of an embodiment of the present concepts.

FIG. 7 shows a reveal of a random outcome (or random outcomes) following the spinning of the video reels 461*a*-461*e* and mechanical reels 460*a*-460*e* in FIG. 6. In FIG. 7, a pay line 450*j* selected by a player (e.g., a player placed a wager on the pay line) extends through the bottom symbol position of mechanical reel 460*a*, the video reel 461*b*, the bottom symbol position of mechanical reel 461*c*, the video reel 461*d*, and the bottom symbol position of mechanical reel 461*e*. The outcomes associated with each of these symbols positions is, in the illustrated example, the "DIAMOND DOUBLE" symbol. In this instance, the player received an award, associated with the depicted winning outcome, because the player bet on a pay line 450*j* including the "Bonus Zone" and that specific pay line was ultimately associated with the winning outcome. Had the player not selected and wagered upon pay line 450*j* in the illustrated example, the player would have lost that particular wager.

In accord with the above-described concepts, the disclosed combination of mechanical reel(s) and video reel(s) advantageously enhances the entertainment value and visual presentation of the wagering games. The concepts presented herein further provide additional flexibility in wagering game design.

Each of these embodiments and obvious variations thereof is contemplated as falling within the spirit and scope of the claimed invention, which is set forth in the following claims. For example, the aforementioned video reel symbols may be automatically applied to any outcome displayed on the mechanical reels, thereby obviating any need for a player to actually select a pay line traversing a video reel symbol position. In at least some aspects of the above-described embodiments of the present concepts, a video display was used to expand the mechanical array. In other variants, the video display expansion of the mechanical reel display may include a display other than the primary display 14 and may include, for example, a secondary display or an area display (e.g., for banked gaming machines). In a banked group of gaming machines, for example, a single area display may comprise the "Bonus Zone" which is to be used in combination with the outcomes of the mechanical reels on each of the associated gaming machines. The area display would periodically (e.g., every 2 seconds, every 5 seconds, every 10 seconds, every minute, etc.) display a new outcome to be applied in combination with outcomes on the associated gaming machines. In aspects thereof, the players may be required to wager upon pay lines including such area display to enjoy the benefit of outcomes of the combination of the mechanical reels and video reel(s) or, alternatively, such combination may be automatic, regardless of a separate wager thereon.

Additionally, although certain features are or may be described as being selectable, such as by a player, any selections or any selection based feature may be performed by a player or may alternatively be performed by a controller.

What is claimed is:

1. A gaming machine for playing a base wagering game, comprising:

a game display comprising a plurality of mechanical reels bearing symbols configured to display randomly selected arrays of symbols;

a video display overlaying the game display, the video display being configured to display a video reel laterally adjacent to one of the plurality of mechanical reels, the video reel being positioned so as to not overlay any of said plurality of mechanical reels and being configured to display a randomly selected symbol thereon, the plurality of mechanical reels and the video reel defining, in combination, a single evaluatable array of symbol positions, the gaming machine being configured to simultaneously display prior to initiation of the base wagering game, via the video display and the game display, a plurality of selectable pay lines selectable from the group consisting of at least one selectable pay line extending through only the mechanical reels and at least one selectable pay line extending through at least one of the mechanical reels and extending through the video reel; and a controller configured to conduct the base wagering game following selection of one or more of the at least one selectable pay lines and following receipt of an instruction to initiate the base wagering game, to display an outcome of the base wagering game in the single evaluatable array of symbol positions comprising both the video reel of the video display and the plurality of mechanical reels, and to award an award in the base wagering game when the outcome comprises, along a selected pay line, a winning combination of symbols displayed therealong.

2. The gaming machine of claim 1, wherein the controller is configured, in association with the conduct of the wagering game, to randomly determine a first outcome associated with the video reel and, independent of the random determination of the first outcome, to randomly determine a second outcome associated with the plurality of mechanical reels.

3. The gaming machine of claim 1, wherein the video display is configured to display a plurality of video reels.

4. The gaming machine of claim 1, wherein the plurality of mechanical reels are configured to display randomly-selected symbols selected from a first set of symbols, and wherein the video reel is configured to display a randomly-selected symbol selected from a second set of symbols, at least one symbol in the second set of symbols being different from any of the symbols in the first set of symbols.

5. The gaming machine of claim 3, wherein the video display is configured to display the video reels directly above or directly below or laterally offset from adjacent respective ones of the plurality of symbol-bearing mechanical reels.

6. The gaming machine of claim 5, wherein the video display includes a touch screen.

7. The gaming machine of claim 1, wherein the video display is a transmissive display.

8. A gaming system for conducting a base wagering game, comprising:

a mechanical reel display having a plurality of symbol-bearing mechanical reels configured to indicate, in symbol positions corresponding to a first portion of an evaluatable array, a first portion of a randomly determined outcome of the base wagering game;

a video display overlaying the mechanical reel display, the video display being configured to display, in at least one symbol position corresponding to a second portion of the evaluatable array, a video reel laterally adjacent to one of the plurality of symbol-bearing mechanical reels and positioned so as to not overlay any of said plurality of symbol-bearing mechanical reels and so as to display in association therewith a symbol corresponding to a second portion of the randomly determined outcome of the base wagering game;

a plurality of selectable pay lines simultaneously displayed for selection before initiation of the base wagering game, at least one selectable pay line in said plurality of selectable pay lines extending through only the symbol-bearing mechanical reels in the first portion of the evaluatable array and at least one selectable pay line in said plurality of selectable pay lines extending through at least some of the symbol-bearing mechanical reels in the first portion of the evaluatable array and further extending through the video reel in the second portion of the evaluatable array, said at least one selectable pay line being enabled by the gaming system to be selected by a player prior to initiation of the base wagering game; and a controller communicatively coupled to the mechanical reel display and the video display, the controller being programmed to randomly determine the base wagering game outcome comprising both symbol-bearing mechanical reel symbols and a video reel symbol, to initiate the base wagering game following selection of at least one selectable pay line, and to display the randomly-determined outcome of the base wagering game in the evaluatable array consisting of the first portion of the evaluatable array and the second portion of the evaluatable array.

9. The gaming system of claim 8, wherein the controller is configured, in association with the conduct of the wagering game, to randomly determine a first outcome associated with the video reel and, independent of the random determination of the first outcome, to randomly determine a second outcome associated with the plurality of symbol-bearing mechanical reels.

10. The gaming system of claim 8, wherein the video display overlaying the mechanical reel display is configured to display a plurality of video reels.

11. The gaming system of claim 10, wherein each one of the plurality of video reels are disposed directly laterally adjacent a respective one of the symbol-bearing mechanical reels.

12. The gaming system of claim 11, wherein a number of video reels is equal to a number of mechanical reels.

13. The gaming system of claim 8, wherein the video display is a transmissive display.

14. The gaming system of claim 8, wherein the video reel symbol is selected from a set of symbols that are different than the set of symbols from which the mechanical reel symbols are selected.

15. A gaming machine for playing a base wagering game, comprising:

a game display comprising a plurality of mechanical reels bearing symbols selected from a first set of symbols, the mechanical reels being configured to display a randomly determined array of the symbols;

a transmissive display, overlaying the game display, configured to display a video reel laterally adjacent a symbol-bearing mechanical reel and positioned so as to not overlay said symbol-bearing mechanical reel, the video reel comprising at least one symbol position adapted to display a symbol randomly selected from a second set of symbols, and configured to simultaneously display, in combination with the game display, at least one selectable pay line, selectable prior to initiation of the wagering game, extending through a pre-defined set of symbol positions from only the plurality of mechanical reels and at least one selectable pay line, selectable prior to initiation of the wagering game, extending through a pre-defined set of symbol positions from the video reel and from a subset of the plurality of mechanical reels;

a controller configured to conduct the wagering game following receipt of a selection of one or more selectable pay lines to activate the selected one or more selectable pay lines and following receipt of an instruction to initiate the wagering game, causes the game display and the transmissive display to display, in combination, an outcome of the base wagering game in a base game array comprising both the video reel of the video display and the plurality of mechanical reels of the game display, and causes the gaming machine to award an award in the base wagering game related to any selected pay line having a winning combination of symbols displayed therealong in association with the base wagering game.

16. The gaming machine of claim 15, wherein the transmissive display is configured to display a plurality of video reels, each of the video reels being disposed adjacent to a corresponding one of the plurality of symbol-bearing mechanical reels, each video reel comprising at least one symbol position adapted to display a random selected symbol from the second set of symbols.

17. The gaming machine of claim 15, wherein the first set of symbols is different than the second set of symbols.

18. The gaming machine of claim 15, wherein the transmissive display includes a touch screen.

19. A method of conducting a wagering game on a wagering game machine comprising a first display comprising a plurality of symbol-bearing mechanical reels positioned to display symbols in symbol positions corresponding to a first portion of an evaluatable array and a second display comprising a transmissive display overlaying the first display, the transmissive display being configured to display video content comprising a video reel that does not overlay the symbol-bearing mechanical reels, the video reel being positioned to display a symbol in a symbol position corresponding to a second portion of the evaluatable array, comprising:

using an interface device, accepting an input wager;

simultaneously displaying a plurality of pay lines available for selection before initiation of the base wagering game, said plurality of pay lines available for selection comprising at least one pay line extending through a set of symbol positions corresponding to only the symbol-bearing mechanical reels of the first portion of the evaluatable array and at least one pay line extending through a set of symbol positions corresponding to both one or more symbol-bearing mechanical reels of the first portion of the evaluatable array and the video reel of the second portion of the evaluatable array;

receiving a selection of at least one of the displayed plurality of pay lines;

initiating a game sequence of the wagering game following the receiving of the selection of the at least one of the displayed plurality of pay lines and, using at least one processor, randomly-determining an outcome of the wagering game;

displaying on the first display and the second display overlaying the first display, the randomly-determined outcome of the wagering game using the plurality of symbol-bearing mechanical reels of the first display and the video reel of the second display, the displaying of the randomly-determined outcome of the wagering game comprising portraying the first portion and the second portion of the evaluatable array on the plurality of symbol-bearing mechanical reels and the video reel, respectively, and wherein the video reel is displayed on the second display in a position laterally adjacent to one of the plurality of mechanical reels and positioned so as not to overlay any of said mechanical reels.

20. The method of claim 19, further comprising:

evaluating, using the at least one processor, whether the randomly-determined outcome portrayed in the evaluatable array comprises a winning combination of symbols displayed on the at least one payline, and awarding an award responsive to a winning combination of symbols displayed on a selected one of the at least one of the displayed plurality of pay lines.

21. The method of claim 19, further comprising:

using the at least one processor to determine an outcome of the wagering game, the outcome comprising a selection of symbols to populate symbol positions for the symbol-bearing mechanical reels and a selection of a symbol to populate the at least one symbol position selected from the video reel of the second display, wherein a set of symbols available to populate the at least one symbol position selected from the video reel differs from the symbols borne by the symbol-bearing mechanical reels by at least one symbol.

22. A gaming machine for playing a wagering game, comprising:

a game display comprising a plurality of mechanical reels, each reel defining a plurality of symbol positions, each symbol position bearing a symbol, the mechanical reels being configured to display a randomly determined array of the symbols;

a transmissive display, overlaying the game display, configured to display a video reel laterally adjacent at least one of the plurality of mechanical reels and positioned so as to not overlay any of the mechanical reels, the video reel comprising at least one symbol position adapted to display a randomly determined symbol the gaming machine being configured to simultaneously display, prior to initiation of the base wagering game, via the transmissive display and the game display, a first plurality of selectable pay lines extending through symbol positions of only the plurality of mechanical reels and at least one selectable pay line extending through symbol positions of at least one mechanical reel and at least one video reel; and a controller configured to display an outcome of the wagering game in an evaluatable array comprising the at least one symbol position of the video reel and symbol positions of at least one mechanical reel, and to award an award related to the at least one selectable pay line when a winning combination of symbols are displayed in symbol positions of the evaluatable array that are associated with an active pay line.

23. The gaming machine of claim 22, wherein the transmissive display is configured to display a plurality of video reels, each of the plurality of video reels being disposed adjacent to a corresponding one of the plurality of symbol-bearing mechanical reels, each video reel comprising at least one symbol position adapted to display a random selected symbol.

24. The gaming machine of claim 22, wherein the symbols borne by the mechanical reels differ from the symbols available to the video reel by at least one symbol.

25. The gaming machine of claim 23, the gaming machine being configured to simultaneously display, prior to initiation of the base wagering game, via the transmissive display and the game display, a first plurality of selectable pay lines extending through symbol positions of only the plurality of mechanical reels and a second plurality of selectable pay lines extending through symbol positions of at least one mechanical reel symbol and at least one video reel symbol position.

* * * * *

UNITED STATES PATENT AND TRADEMARK OFFICE

CERTIFICATE OF CORRECTION

PATENT NO. : 8,636,579 B2
APPLICATION NO. : 12/513788
DATED : January 28, 2014
INVENTOR(S) : Hornik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 815 days.

Signed and Sealed this
Twenty-second Day of September, 2015

Michelle K. Lee
*Director of the United States Patent and Trademark Office*